Nov. 22, 1966  R. WICK ET AL  3,286,588
OPTICAL COPYING APPARATUS
Filed Dec. 17, 1963
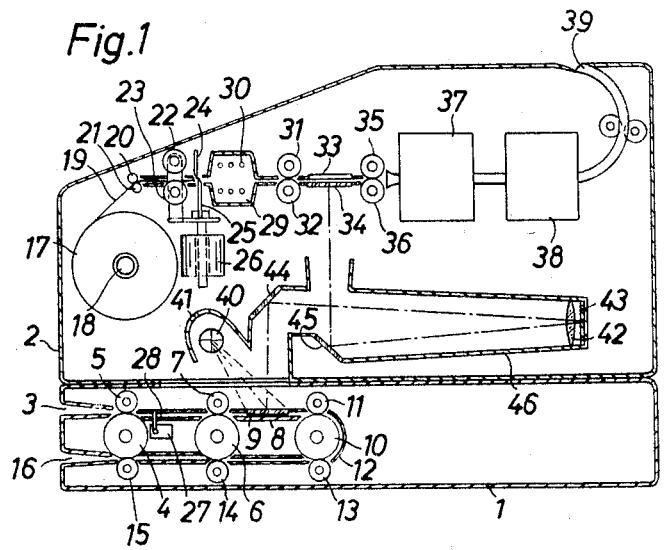
*INVENTORS*
RICHARD WICK
JÜRGEN ORTHMANN
BY Michael S. Striker
Attorney

United States Patent Office 3,286,588
Patented Nov. 22, 1966

3,286,588
OPTICAL COPYING APPARATUS
Richard Wick and Jürgen Orthmann, Grunwald, Munich, Germany, assignors to Agfa Aktiengesellschaft, Leverkusen, Germany
Filed Dec. 17, 1963, Ser. No. 331,207
Claims priority, application Germany, Dec. 18, 1962, A 41,913
11 Claims. (Cl. 88—24)

The present invention relates to optical copying devices.

For example, the present invention is applicable to electro-optical copying devices whereby a process known as xerography, for example, it is possible to make copies of different subjects.

With conventional structure of the above type the sheet which carries the subject mater to be copied and the sheet which has the photosensitive material for receiving an image of the subject matter to be copied are both supported in a common plane. As a result it is not possible to locate the area of the subject which is to be copied and the area which receives an image of the subject very close to each other, and on the other hand the objective which directs an image of the subject to the photosensitive sheet is required to transmit the light to the photosensitive sheet along a path which makes a relatively large angle with respect to the path along which the light moves to the objective from the subject which is to be copied, and since such an objective conventionally includes half of the components of a conventional projecting objective since a reflector behind the objective and parallel to the common plane of the sheets directs light which passes through the objective from the subject to be copied back through the objective toward the photosensitive sheet, all of the capabilities of very high quality objectives are called upon for producing proper images under these conditions.

It is accordingly a primary object of the present invention to improve a copying apparatus of the above type by making it possible to provide an assembly which is far more compact that the above-described conventional assembly while at the same time greatly reducing the angle between the light rays which move to the objective and the light rays which move from the objective.

It is also an object of the invention to provide a structure of the above type which makes it possible for the sheets which respectively carry the subject to be copied and the photosensitive layer for receiving an image of the subject to both move in the same direction through the apparatus, as contrasted with conventional apparatus where the sheets move in opposite directions.

Also, it is an object of the present invention to provide a structure of the above type where the image-forming components are very compactly situated with respect to each other and can conveniently be carried by a common supporting structure which can easily be mounted in and removed from the apparatus.

Furthermore, it is an object of the present invention to provide a structure of the above type which is exceedingly simple and reliable in operation.

With the above objects in view the invention includes, in an optical copying apparatus, a first positioning means for positioning a sheet, which carries subject matter which is to be copied, in a predetermined area of a subject plane, and a second positioning means for positioning a sheet which has a photosensitive layer in a predetermined area of an image plane which is spaced from and substantially parallel to the subject plane. In accordance with the present invention, in addition to situating the above sheets in a pair of substantially parallel planes, there is situated between these planes an image-forming means which directs to the predetermined area of the image plane an image of the subject which is located at the predetermined area of the subject plane, and this image-forming means includes an objective which has an optical axis extending between and substantially parallel to these planes, and in addition the image-forming means includes a subject reflector which faces the predetermined area of the subject plane and the objective for directing to the latter light rays from the predetermined area of the subject plane, an objective reflector located behind the objective on the side thereof opposite from the subject reflector for directing past through the objective light rays received from the subject reflector, and an image reflector which faces the predetermined area of the image plane and the objective for receiving from the latter the light rays which have been directed back therethrough by the objective reflector and for directing these light rays to the predetermined area of the image plane.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a longitudinal sectional elevation of one possible embodiment of a structure according to the present invention; and FIG. 2 shows a modification of FIG. 1 in which a subassembly thereof is rendered removable from the rest of the apparatus.

The apparatus illustrated in the drawing is capable of being used as an electro-photographic office copying machine in which the subject matter which is to be copied while passing through a station where it is properly illuminated is capable of being copied on a 1:1 scale at elongated areas which are copied in a right-side-up manner on the copy sheet which moves thruogh the exposure station of the machine at the same speed that the subject sheet moves through the illuminating station.

Referring now in more detail to the structure shown in FIG. 1, the apparatus illustrated therein includes a lower unit 1 and a housing 2 which is located on the lower unit 1. This lower unit 1 includes a positioning means for positioning a sheet, which carries subject matter to be copied, in a predetermined area of a subject plane, this area being defined by the transparent pressure plate 9. Thus, the lower unit 1 includes an inlet slot or guide 3 into which the sheet which is to be copied is fed, and the positioning means includes the cooperating pairs of transporting rollers 4, 5 and 6, 7 which transport the sheet to the right, as viewed in the drawing, in a substantially horizontal plane, which is the subject plane, and in this way the sheet will reach the area beneath the transparent pressure plate 9 while being guided by a guide plate 8 which is situated beneath the sheet, so that in this way the rollers serve to position the sheet in a predetermined area of a subject plane, this predetermined area being determined by the area of the transparent pressure plate 9, as mentioned above. After passing through this predetermined area of the subject plane, which also forms the illuminating station where the subject matter to be copied is illuminated, the sheet is transported further by a pair of cooperating transporting rollers 10 and 11 and when moving beyond these rollers the sheet is guided by a guide member 12 around to the lower rollers 13–15 which respectively cooperate with the rollers 10, 6 and 4 to continue the transportation of the sheet to the outlet 16 which is identical with but situated beneath the inlet 3 at the front lower portion of the machine. The rollers 4, 6, and 10 are driven in a clockwise direction, as viewed in the drawing, in any suitable way, and the remaining rollers are driven by cooperation with these rollers 4, 6, and 10.

The sheet which will receive the image which is a copy of the subject to be copied carries a photosensitive layer which may, for example, be a zinc oxide layer, and this sheet is withdrawn from a supply roll 17 supported in the housing 2 for rotation by a suitable shaft 18. The copy sheet 19 which is withdrawn from the roll 17 is guided by a pair of guide rollers 20 and 21 and is transported by a pair of transporting rollers 22 and 23 which on the one hand withdraw the sheet from the roll 17 and which on the other hand deliver the sheet to the cutting device 24, 25 which cuts the sheet into individual sections, the blade 25 and the upper transporting roller 22 being controlled by the electromagnet 26. Thus, the axis of the lower transporting roller 23 may be stationary and this roller may be continuously driven while the cutting blade 24 is stationary. On the other hand, the roller 22 and the blade 25 move together with the armature of the solenoid 26. When the solenoid 26 is unenergized, for example, the blade 25 will be spaced beneath the blade 24 and the roller 22 will be located next to the roller 23 to cooperate with the latter for transporting the sheet 19 to the right, as viewed in the drawing, whereas when an impulse is delivered to the solenoid 26 its armature will move upwardly to space the upper roller 22 from the roller 23 to stop the transportation of the sheet material while simultaneously moving the blade 25 across the blade 24 to cut the sheet material, and when the solenoid 26 is again unenergized the transportation of the sheet 19 will continue. The circuit of the solenoid 26 is controlled by a microswitch 27 which is in turn controlled by a feeler lever 28 which senses whether or not there is a sheet moving from the rollers 4, 5 toward the rollers 6, 7. If there is such a sheet present the feeler lever 28 will actuate the switch 27 so as to deenergize the solenoid 26 and thus the sheet 19 will also be transported, whereas when the end of the sheet which has been introduced through the inlet 3 moves beyond the feeler lever 28 the switch 27 will be actuated to energize the solenoid 26 and terminate the movement of the sheet 19 while cutting off the portion which has already been transported by the rollers 22 and 23. Of course, these operations may be carried out in such a way that the cutting and termination of the transportation takes place when the solenoid 26 is unenergized and the blade 25 is spaced from the blade 24 while the roller 22 cooperates with the roller 23 when the solenoid 26 is energized.

The section of the sheet which moves beyond the cutting assembly 24, 25 moves first through a charging station 29 provided with a wire assembly 30 at relatively high voltage for giving the photosensitive layer an electrostatic charge which may be either positive or negative, as is well known in the art of xerography, and then after being electrostatically charged in this way the sheet is transported further by the rollers 31 and 32 which act as a positioning means for positioning the sheet in a predetermined area of an image plane, this latter predetermined area being defined by the transparent pressure plate 34 which is located beneath and engages the photosensitive, electrostatically charged layer. It will be noted that the image plane is substantially parallel to the subject plane and spaced above the latter while the predetermined area which is defined by the transparent pressure plate 34 is offset to a relatively slight extent to the right beyond the predetermined area of the subject plane which is defined by the transparent pressure plate 9. After moving through the predetermined area of the image plane, where the sheet is also guided by a guide plate 33 situated on the side of the sheet opposite from the transparent plate 34, the transporting rollers 35 and 36 will deliver the sheet into a known and therefore unillustrated developing device 37 in which the exposed layer is developed, and thereafter the sheet will move into a fixing unit 38 where the developed image will be fixed, the unit 38 also being well known and therefore unillustrated, and thereafter the sheet will move through a suitable guide 39 out of the apparatus through the upper rear portion thereof, which may form part of the cover of the machine.

Thus, in this way it will be seen that both sheets are transported in the same directions in a pair of substantially parallel planes, and the transporting rollers for both sheets are driven from a common, unillustrated electric motor in such a way that both of the sheets are transported at precisely the same speed in the same directions through the apparatus in the manner described above.

An image-forming means is provided for producing at the predetermined area of the image plane an image of the subject which is located at the predetermined area of the subject plane, and this image forming means is situated in the housing 2 between the image plane and the subject plane and moreover the image-forming means will provide elongated, strip-shaped images which are right-side-up.

The predetermined area of the subject plane which is defined by the transparent plate 9 also forms an illuminating station, and for this purpose an illuminating means 40, 41 is provided, this illuminating means including an elongated tubular light source 40 and a reflector 41 which serve to direct light rays to the predetermined area of the subject plane where the subject to be reproduced is located.

The image-forming means includes an objective 42 which is schematically illustrated and which has an optical axis which is located between and extends substantially parallel to the image and subject planes. Furthermore, the image-forming means includes a reflector 44 which is located along a straight line extending perpendicularly from the predetermined area of the subject plane and which faces the subject plane as well as the objective 43 for directing to the latter light rays received from the predetermined area of the subject plane. Behind the objective 42 is situated an objective reflector 43 which is on the side of the objective 42 opposite from the reflector 44, and this reflector 43 is in a plane which is normal to the optical axis of the objective and serves to direct back through the objective light rays which have been directed to the objective from the reflector 44. An image reflector 45 is located along a straight line which extends perpendicularly from the predetermined area of the image plane, and this reflector 45 receives the light rays from the objective and directs them to the predetermined area of the image plane, so that in this way stripwise, right-side-up images of the subject are produced on the copy sheet. Moreover, it will be noted that the rays which are directed by the reflector 45 to the predetermined area of the image plane cross the rays which are directed by the subject reflector 44 to the objective 42. Inasmuch as the rays which reach the objective 42 are directed back through the latter by the objective reflector 43, this objective 42, which is only schematically illustrated as pointed out above, includes only one-half of the components of a symmetrical conventional objective assembly of a projector. It will be noted that the reflectors 44 and 45 are located closely adjacent to the optical axis of the objective 42 approximately at angles of 45 degrees thereto.

A common carrier means is provided for carrying the reflectors 44 and 45, and this common carrying means is in the form of an elongated tube 46 in which the light rays which pass between the reflectors 44 and 45 and the objective 42 are located, this tube 46 also serving to carry both the objective 42 and the objective reflector 43. In this way the image-forming means 42–46 forms a unitary subassembly which can easily be introduced into and removed from the apparatus. Thus, as may be seen from FIG. 2, the housing 2 fixedly carries at its bottom wall elongated guides 47 which may have a substantially L-shaped configuration and on which the image-forming means 42–46 rests. In this case the image-forming means is longitudinally slidable along the guides 47 into and out of the housing 2 through an opening in the right wall thereof, as viewed in FIG. 2. The portion 41 of the image-forming means is elongated so as to be provided with an extension 46a which has a lower horizontal wall portion formed with a notch extending inwardly from its left edge, as viewed in FIG. 2, so that during movement of the subassembly into the housing 2 toward the left, as viewed in FIG. 2, the shank of a rivet 48 which is fixed to the bottom wall of the housing 2 is received in this notch, and in the same way the right end of the assembly fixedly carries a member 49 having a bottom wall portion 49a formed with a notch extending inwardly from its left edge and receiving the shank of a rivet 50 which is fixed to the bottom wall of the housing 2. During movement of the image-forming means into the housing, toward the left, as viewed in FIG. 2, the shanks of the rivets 48 and 50 are received in these notches and the operator continues to move the assembly into the housing until the flange 49b of the member 49 engages the right wall of the housing 2. The member 49 is a hollow substantially cup-shaped member, except that it has an open bottom, and the flange 49b is of a substantially U-shaped configuration and engages the right wall of the housing 2 along the entire length of this flange 49b so that a substantially dust-tight and light-tight closure is provided. The rivets 48 and 50 are provided with head ends 48a and 50a the diameters of which are wider than the notches which receive the shanks of the rivets so that when the assembly is mounted in the housing as shown in FIG. 2 it is restrained against vertical movement as viewed in FIG. 2. Of course, instead of relying upon the rivet heads for this purpose it is possible instead to construct the guides 47 so that they have upper flanges spaced from the bottom wall of the housing 2 and overlapping outer side edge portions of the horizontal walls 46a and 49a, so that in this way also the unitary subassembly will be guided by elements 47 and in addition will be restrained thereby against movement away from the bottom wall of the housing 2. Within its hollow interior the member 49 carries a handle 51 which is large enough to be conveniently grasped by the operator but small enough so that it does not extend outwardly beyond the member 49. Thus, the apparatus can conveniently be inserted and withdrawn by engaging the handle 51.

While the above-described offset relationship between the reflectors 44 and 45 is preferred because of the relatively compact construction resulting therefrom and because practically no stray light can pass from the illuminating station to the exposure station, nevertheless this offset relationship between the reflectors 44 and 45 is not absolutely essential.

Where the predetermined areas determined by the transparent plates 9 and 34 are relatively narrow, it is possible to replace the guide plates 8 and 33 by suitable rollers.

Furthermore, while the invention has been described above in connection with a machine where the sheets move continuously therethrough while a copy is being made, the invention is also fully applicable to that part of the machine which both the subject sheet and the copy sheet remains stationary while a copy is being made. Moreover, the invention is not necessarily limited to copying devices which operate electro-photographically.

As is apparent from the above description, with the structure of the invention an exceedingly compact assembly is provided as a result of arranging the planes for the pair of sheets parallel to and spaced from each other, and moreover because the image-forming means is situated between the planes where the sheets are located the light which travels to the objective makes a relatively small angle with the light which travels from the objective. Because of this feature there is absolutely no reduction in the quality of the image while at the same time the optical requirements of the objective are not as great as is required with an objective where the angle between the light rays moving to and from the objective is relatively great.

It will be understood that each of the elements described above, or two or more together, may also find a useful application in other types of copying devices differing from the types described above.

While the invention has been illustrated and described as embodied in optical copying devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an optical copying apparatus, in combination, first positioning means for positioning at least a portion of a sheet, which has thereon subject matter to be copied, in a predetermined area of a subject plane; second positioning means for positioning at least a portion of a sheet having a photosensitive surface in a predetermined area of an image plane which is substantially parallel to and spaced from said subject plane; and image-forming means situated between said planes for directing to said predetermined area of said image plane an image of subject matter located at said predetermined area of said subject plane, said image-forming means including an objective which has an optical axis which is substantially parallel to and located between said planes, a subject reflector facing said predetermined area of said subject plane and said objective for directing an image of subject matter at said predetermined area of said subject plane to said objective, an objective reflector located behind said objective at the side thereof opposite from said subject reflector for directing back through the objective the rays which are directed toward said objective by said subject reflector, and an image reflector facing said objective and said predetermined area of said image plane for receiving the rays directed back through said objective by said objective reflector and for directing said rays to said predetermined area of said image plane for forming an image of the subject matter at said predetermined area of said subject plane on a photosensitive surface of a sheet located at said predetermined area of said image plane.

2. In an optical copying apparatus, in combination, first positioning means for positioning a sheet, which has thereon subject matter to be copied, in a predetermined area of a subject plane; second positioning means for positioning a sheet having a photosensitive surface in a predetermined area of an image plane which is substantially parallel to and spaced from said subject plane; and image-forming means situated between said planes for directing to said predetermined area of said image plane an image of subject matter located at said predetermined area of said subject plane, said image-forming means including an objective which has an optical axis which is substantially parallel to and located between said planes, a subject reflector facing said predetermined area of said subject plane and said objective for directing an image of subject matter at said predetermined area of said subject plane to said objective, an objective reflector located behind said objective at the side thereof opposite from said subject reflector for directing back through the objective the rays which are directed toward said objective by said subject reflector, and an image reflector facing said objective and said predetermined area of said image plane for receiving the rays directed back through said objective by said objective reflector and for directing said rays to said predetermined area of said image plane for forming an image of the subject matter at said predetermined area of said subject plane on a photosensitive surface of a sheet located at said predetermined area of said image plane, said subject and image reflectors being located closely adjacent to the optical axis.

3. In an optical copying apparatus, in combination, first positioning means for positioning a sheet, which has thereon subject matter to be copied, in a predetermined area of a subject plane; second positioning means for positioning a sheet having a photosensitive surface in a predetermined area of an image plane which is substantially parallel to and spaced from said subject plane; and image-forming means situated between said planes for directing to said predetermined area of said image plane an image of subject matter located at said predetermined area of said subject plane, said image-forming means including an objective which has an optical axis which is substantially parallel to and located between said planes, a subject reflector facing said predetermined area of said subject plane and said objective for directing an image of subject matter at said predetermined area of said subject plane to said objective, an objective reflector located behind said objective at the side thereof opposite from said subject reflector for directing back through the objective the rays which are directed toward said objective by said subject reflector, and an image reflector facing said objective and said predetermined area of said image plane for receiving the rays directed back through said objective by said objective reflector and for directing said rays to said predetermining area of said image plane for forming an image of the subject matter at said predetermined area of said subject plane on a photosensitive surface of a sheet located at said predetermined area of said image plane, said subject and image reflectors being located closely adjacent to the optical axis and said image reflector being located nearer to said objective than said subject reflector and directing to said image plane rays which cross the rays which are directed by said subject reflector to said objective.

4. In an optical copying apparatus, in combination, first positioning means for positioning a sheet, which has thereon subject matter to be copied, in a predetermined area of a subject plane; second positioning means for positioning a sheet having a photosensitive surface in a predetermined area of an image plane which is substantially parallel to and spaced from said subject plane; image-forming means situated between said planes for directing to said predetermined area of said image plane an image of subject matter located at said predetermined area of said subject plane, said image-forming means including an objective which has an optical axis which is substantially parallel to and located between said planes, a subject reflector facing said predetermined area of said subject plane and said objective for directing an image of subject matter at said predetermined area of said subject plane to said objective, an objective reflector located behind said objective at the side thereof opposite from said subject reflector for directing back through the objective the rays which are directed toward said objective by said subject reflector, and an image reflector facing said objective and said predetermined area of said image plane for receiving the rays directed back through said objective by said objective reflector and for directing said rays to said predetermined area of said image plane for forming an image of the subject matter at said predetermined area of said subject plane on a photosensitive surface of a sheet located at said predetermined area of said image plane; and a single carrier means common to and carrying said subject and image reflectors.

5. In an optical copying apparatus, in combination, first positioning means for positioning a sheet, which has thereon subject matter to be copied, in a predetermined area of a subject plane; second positioning means for positioning a sheet having a photosensitive surface in a predetermined area of an image plane which is substantially parallel to and spaced from said subject plane; image-forming means situated between said planes for directing to said predetermined area of said image plane an image of subject matter located at said predetermined area of said subject plane, said image-forming means including an objective which has an optical axis which is substantially parallel to and located between said planes, a subject reflector facing said predetermined area of said subject plane and said objective for directing an image of subject matter at said predetermined area of said subject plane to said objective, an objective reflector located behind said objective at the side thereof opposite from said subject reflector for directing back through the objective the rays which are directed toward said objective by said subject reflector, and an image reflector facing said objective and said predetermined area of said image plane for receiving the rays directed back through said objective by said objective reflector and for directing said rays to said predetermined area of said image plane for forming an image of the subject matter at said predetermined area of said subject plane on a photosensitive surface of a sheet located at said predetermined area of said image plane; and a single carrier means common to and carrying said subject and image reflectors, said carrier means being in the form of an elongated tube in which the rays which move from said subject reflector to said objective and from said objective to said image reflector are located.

6. In an optical copying apparatus, in combination, first positioning means for positioning a sheet, which has thereon subject matter to be copied, in a predetermined area of a subject plane; second positioning means for positioning a sheet having a photosensitive surface in a predetermined area of an image plane which is substantially parallel to and spaced from said subject plane; image-forming means situated between said planes for directing to said predetermined area of said image plane an image of subject matter located at said predetermined area of said subject plane, said image-forming means including an objective which has an optical axis which is substantially parallel to and located between said planes, a subject reflector facing said predetermined area of said subject plane and said objective for directing an image of subject matter at said predetermined area of said subject plane to said objective, an objective reflector located behind said objective at the side thereof opposite from said subject reflector for directing back through the objective the rays which are directed toward said objective by said subject reflector, and an image reflector facing said objective and said predetermined area of said image plane for receiving the rays directed back through said objective by said objective reflector and for directing said rays to said predetermined area of said image plane for forming an image of the subject matter at said predetermined area of said subject plane on a photosensitive surface of a sheet located at said predetermined area of said image plane; and a single carrier means common to and carrying said subject and image reflectors, said carrier means being in the form of an elongated tube in which the rays which move from said subject reflector to said objective and from said objective to said image reflector are located, said tube also carrying said objective and said objective reflector.

7. In an optical copying apparatus, in combination, first positioning means for positioning a sheet, which has thereon subject matter to be copied, in a predetermined area of a subject plane; second positioning means for positioning a sheet having a photosensitive surface in a predetermined area of an image plane which is substantially parallel to and spaced from said subject plane; and image-forming means situated between said planes for directing to said predetermined area of said image plane an image of subject matter located at said predetermined area of said subject plane, said image-forming means including an objective which has an optical axis which is substantially parallel to and located between said planes, a subject reflector facing said predetermined area of said subject plane and said objective for directing an image of subject matter at said predetermined area of said subject plane to said objective, an objective reflector located behind said objective at the side thereof opposite from said subject reflector for directing back through the objective the rays which are directed toward said objective by said subject reflector, and an image reflector facing said objective and said predetermined area of said image plane for receiving the rays directed back through said objective by said objective reflector and for directing said rays to said predetermined area of said image plane for forming an image of the subject matter at said predetermined area of said subject plane on a photosensitive surface of a sheet located at said predetermined area of said image plane, said image-forming means being in the form of a unitary subassembly which can be mounted in and removed from a housing of the apparatus as a unit.

8. In an optical copying apparatus, in combination, first positioning means for positioning a sheet, which carries subject matter to be reproduced, in a predetermined area of a subject plane; second positioning means for positioning a sheet carrying a photosensitive layer in a predetermined area of an image plane, said predetermined area of said image plane being offset with respect to said predetermined area of said subject plane, and both of said planes being parallel to and spaced from each other; illuminating means located between said planes for illuminating said predetermined area of said subject plane; and image-forming means located between said planes for forming at said predetermined area of said image plane an image of subject matter located at said predetermined area of said subject plane, said image-forming means including an objective having an optical axis located between and substantially parallel to said planes, a subject reflector aligned with said predetermined area of said subject plane and facing said subject plane and said objective for directing to the latter light rays from said predetermined area of said subject plane, an objective reflector located behind said objective and adjacent to said objective on the side thereof opposite from said subject reflector in a plane normal to the optical axis for directing back through the objective rays directed to the latter from said subject reflector, and an image reflector aligned with said predetermined area of said image plane and facing said predetermined area of said image plane and said objective for receiving from the latter rays which have been passed back therethrough by said objective reflector and for directing the rays to said predetermined area of said image plane.

9. In an apparatus as recited in claim 8, said first and second positioning means each including transporting rollers which transport the sheets in said planes.

10. In an optical copying apparatus, in combination, first positioning means for positioning a sheet, which carries subject matter to be copied, in a predetermined area of a subject plane; second positioning means for positioning a sheet which carries a photosensitive layer in a predetermined area of an image plane which is substantially parallel to and spaced from said subject plane, said predetermined areas being offset with respect to each other; and image-forming means situated between said planes for forming at said predetermined area of said image plane an image of subject matter located at said predetermined area of said subject plane, said image-forming means including an objective having an optical axis which is located between and extends substantially parallel to said planes, a subject reflector located along a straight line which extends perpendicularly from said predetermined area of said subject plane and facing said predetermined area of said subject plane and said objective for directing to the latter light rays from said predetermined area of said subject plane, an objective reflector located behind the objective on the side thereof opposite from said subject reflector for passing back through said objective light rays received from said subject reflector, and an image reflector located along a straight line extending perpendicularly from said predetermined area of said image plane and facing said predetermined area of said image plane and said objective for receiving from the latter the rays which have been passed back through said objective by said objective reflector and for directing said rays to said predetermined area of said image plane.

11. In an optical copying apparatus, in combination, first positioning means for positioning at least a portion of a sheet, which has thereon subject matter to be copied, in a predetermined area of a subject plane; second positioning means for positioning at least a portion of a sheet having a photosensitive surface in a predetermined area of an image plane which is spaced from said predetermined area of said subject plane; and image-forming means for directing to said predetermined area of said image plane an image of subject matter located at said predetermined area of said subject plane, said image-forming means including an objective which has an optical axis which is substantially parallel to at least one of said predetermined areas and said objective being spaced laterally from said one predetermined area, a subject reflector facing said predetermined area of said subject plane and said objective for directing an image of subject matter at said predetermined area of said subject plane to said objective, an objective reflector located behind said objective at the side thereof opposite from said subject reflector for directing back through the objective the rays which are directed toward said objective by said subject reflector, and an image reflector facing said objective and said predetermined area of said image plane for receiving the rays directed back through said objective by said objective reflector and for directing said rays to said predetermined area of said image plane for forming an image of the subject matter at said predetermined area of said subject plane on a photosensitive surface of a sheet located at said predetermined area of said image plane.

References Cited by the Examiner

UNITED STATES PATENTS

| 2,234,717 | 3/1941 | Altman et al. | 88—24 |
| 2,439,055 | 4/1948 | Pratt et al. | 88—24 |

NORTON ANSHER, *Primary Examiner.*

RICHARD A. WINTERCORN, *Assistant Examiner.*